US011905109B2

(12) United States Patent
McGourty

(10) Patent No.: US 11,905,109 B2
(45) Date of Patent: Feb. 20, 2024

(54) YARD WASTE COLLECTION ASSEMBLY

(71) Applicant: Mark McGourty, St Charles, MO (US)

(72) Inventor: Mark McGourty, St Charles, MO (US)

( * ) Notice: Subject to any disclaimer, the term of this patent is extended or adjusted under 35 U.S.C. 154(b) by 259 days.

(21) Appl. No.: 17/412,468

(22) Filed: Aug. 26, 2021

(65) Prior Publication Data

US 2023/0064022 A1 Mar. 2, 2023

(51) Int. Cl.
*B65F 1/00* (2006.01)
*B65F 1/14* (2006.01)

(52) U.S. Cl.
CPC .......... *B65F 1/0006* (2013.01); *B65F 1/1415* (2013.01); *B65F 2210/167* (2013.01); *B65F 2240/138* (2013.01)

(58) Field of Classification Search
CPC ............................ B65F 1/0006; B65F 1/1415; B65F 2210/167; B65F 2240/138
USPC .............................................................. 383/4
See application file for complete search history.

(56) References Cited

U.S. PATENT DOCUMENTS 2,766,797 A 10/1956 Cowen
3,202,193 A * 8/1965 Louis ...................... E04F 13/18 383/902
4,519,183 A 5/1985 Parody
5,364,188 A 11/1994 Godfried
RE34,849 E 2/1995 Sanders
5,417,462 A * 5/1995 Hensley ................. A01G 20/40 294/212
5,722,220 A * 3/1998 Greenland ............. A01G 20/43 229/87.01
2006/0215940 A1 * 9/2006 May ....................... A01G 20/43 383/4
2007/0183689 A1 * 8/2007 Leone .................... B65D 33/16 383/17
2018/0022483 A1 * 1/2018 Lenon, III ............. B65D 33/28 53/469

FOREIGN PATENT DOCUMENTS

WO WO9406666 3/1994

* cited by examiner

*Primary Examiner* — Jes F Pascua

(57) ABSTRACT

A yard waste collection assembly includes a tarp that is positionable on a horizontal support surface such that debris cam be positioned on the tarp. The tarp is foldable onto itself to enclose the debris positioned on the tarp. A plurality of adhesive strips is each coupled to the tarp and each of the adhesive strips adheres to a respective one of the adhesive strips when the tarp is folded. In this way the adhesive strips can retain the debris in the tarp thereby facilitating the tarp to transport the debris for disposal. A plurality of stakes is provided and each of the stakes is extendable through a respective one of the stake holes and engage the horizontal support surface to inhibit the tarp from moving on the horizontal support surface.

5 Claims, 5 Drawing Sheets

YARD WASTE COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to waste collection devices and more particularly pertains to a new waste collection device for collecting waste for subsequent disposal. The device includes a tarp upon which debris can be positioned and a plurality of adhesive strips that are each positioned on the tarp. The adhesive strips adhere to each other when the tarp is folded for enclosing the debris in the tarp.

(2) Description of Related Art Including Information Disclosed Under 37 CFR 1.97 and 1.98

The prior art relates to waste collection devices including a tarp with a plurality of strategically positioned holes for tying the tarp around debris. The prior art discloses a tarp which has adhesive applied adjacent to four corners of the tarp to facilitate the tarp to be enclosed around debris that is place on the tarp. The prior art discloses a tarp that includes a plurality of handles that are distributed around the tarp that can be attached together such that the tarp forms a cup for containing debris. The prior art discloses a flexible sheet that has a drawstring integrated into the flexible sheet to facilitate the flexible sheet to be closed around debris.

BRIEF SUMMARY OF THE INVENTION

An embodiment of the disclosure meets the needs presented above by generally comprising a tarp that is positionable on a horizontal support surface such that debris cam be positioned on the tarp. The tarp is foldable onto itself to enclose the debris positioned on the tarp. A plurality of adhesive strips is each coupled to the tarp and each of the adhesive strips adheres to a respective one of the adhesive strips when the tarp is folded. In this way the adhesive strips can retain the debris in the tarp thereby facilitating the tarp to transport the debris for disposal. A plurality of stakes is provided and each of the stakes is extendable through a respective one of the stake holes and engage the horizontal support surface to inhibit the tarp from moving on the horizontal support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
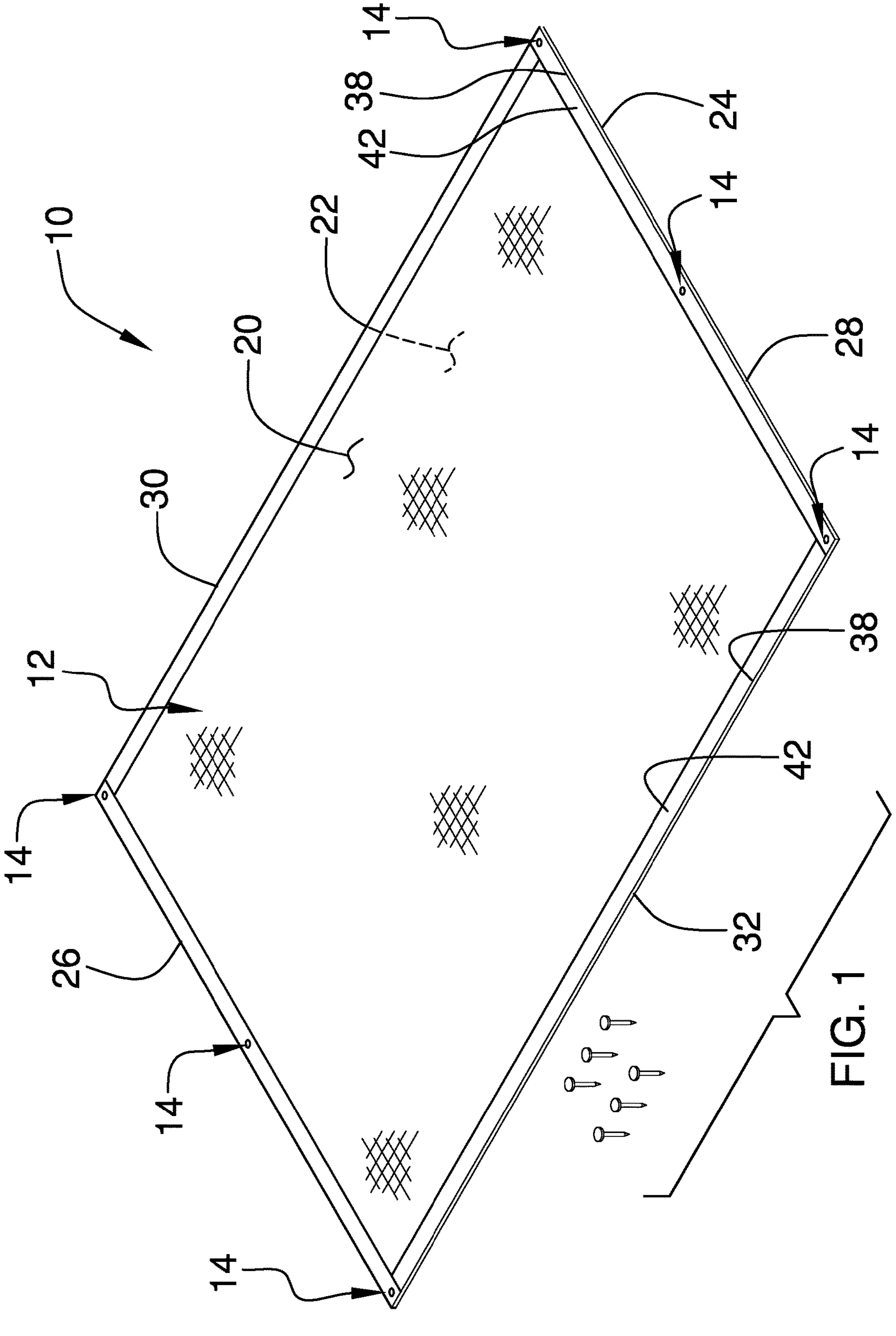
FIG. 1 is a perspective view of a yard waste collection assembly according to an embodiment of the disclosure.
Figure 2:
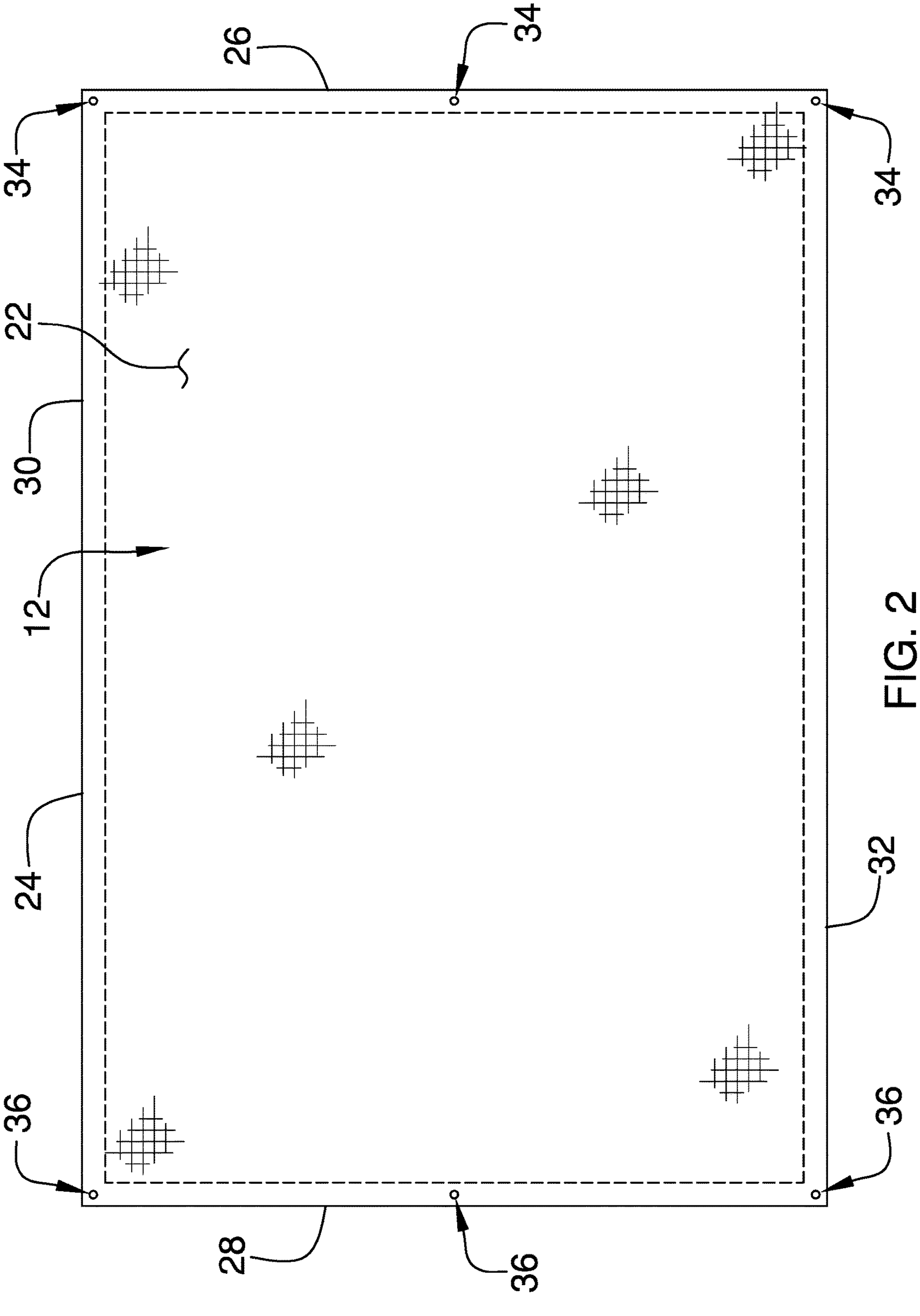
FIG. 2 is a top view of an embodiment of the disclosure.
Figure 3:
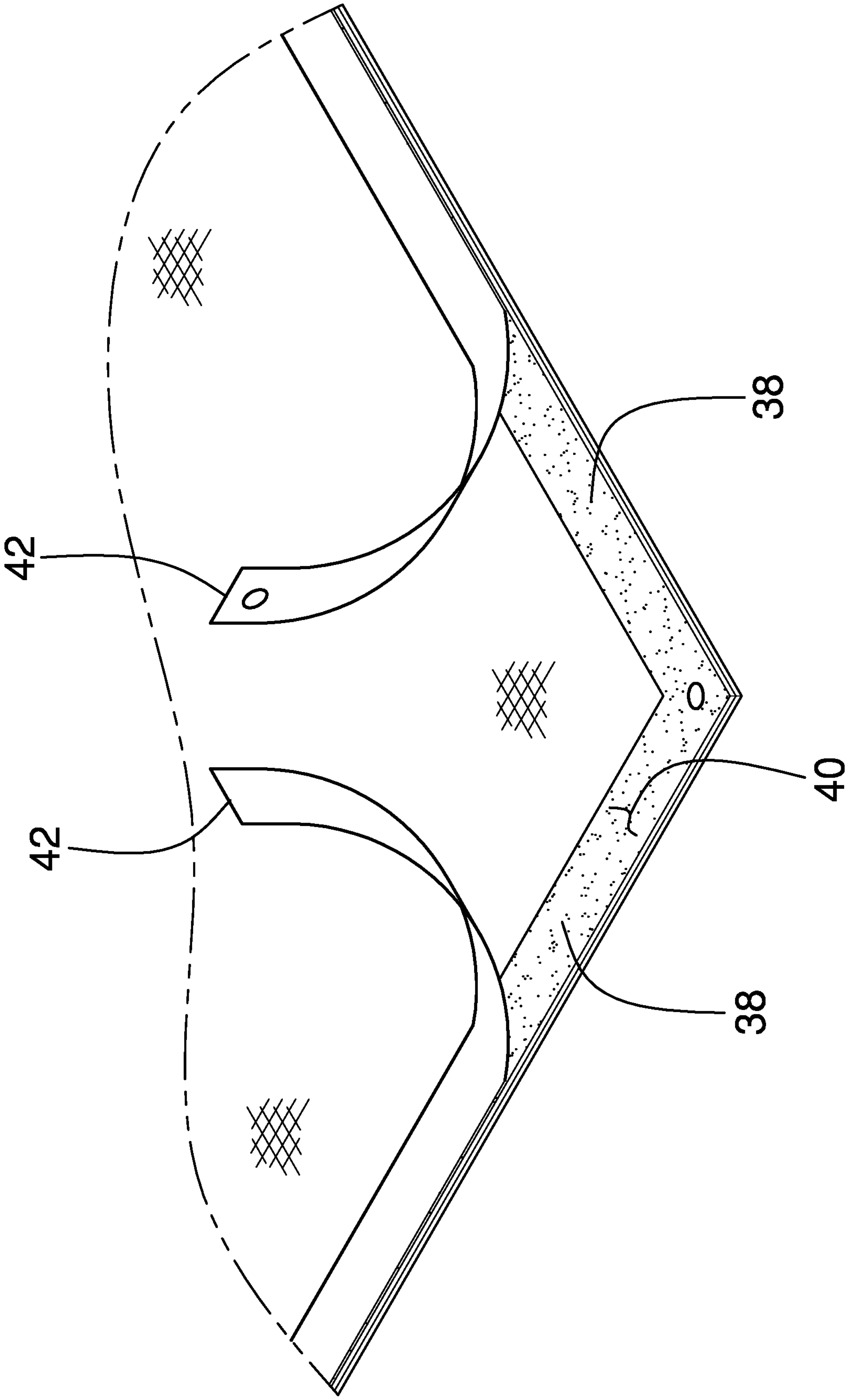
FIG. 3 is a perspective view of an embodiment of the disclosure showing protective sheets being removed from adhesive strips.
Figure 4:
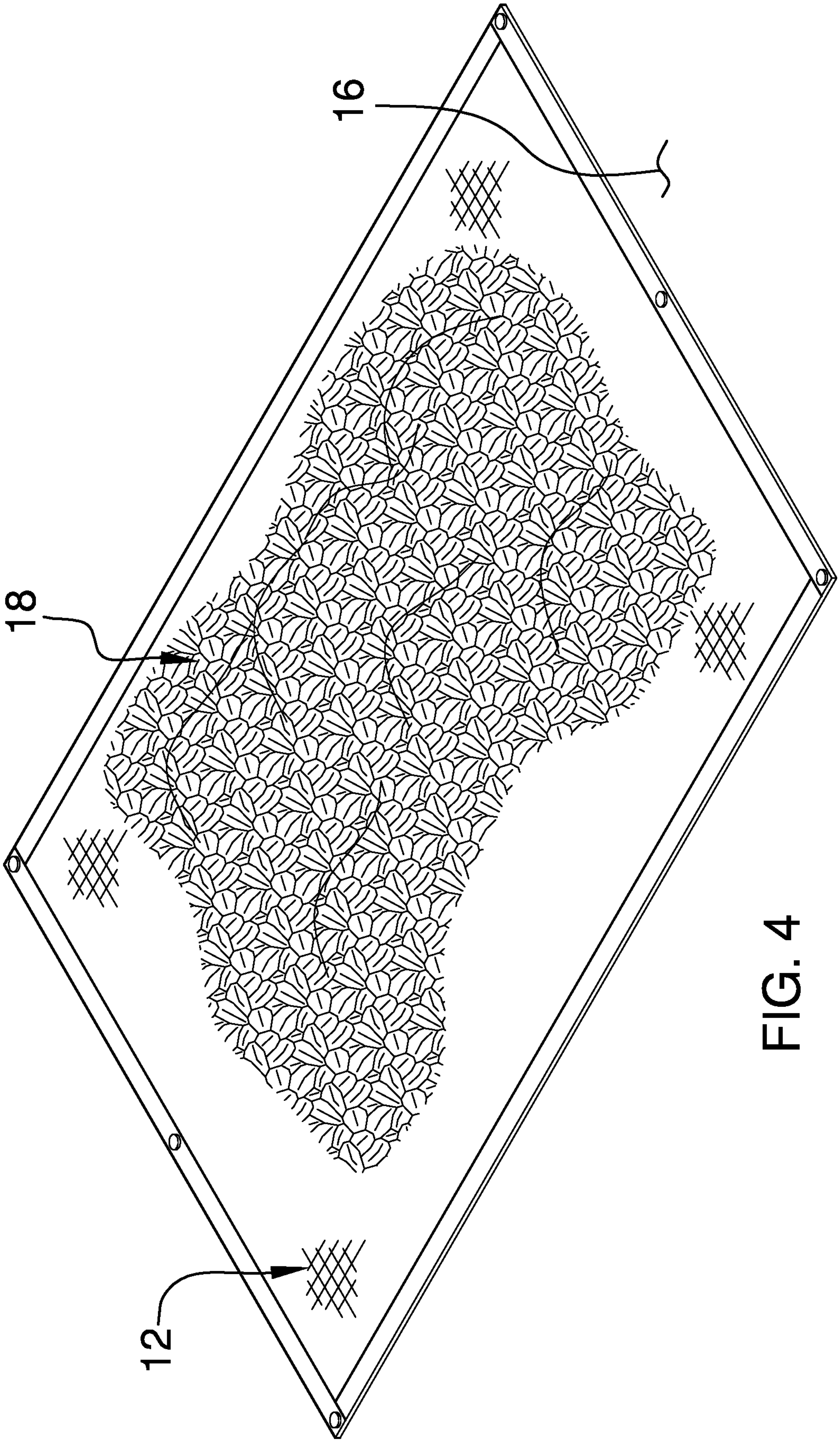
FIG. 4 is a perspective in-use view of an embodiment of the disclosure showing debris being deposited on a tarp.
Figure 5:
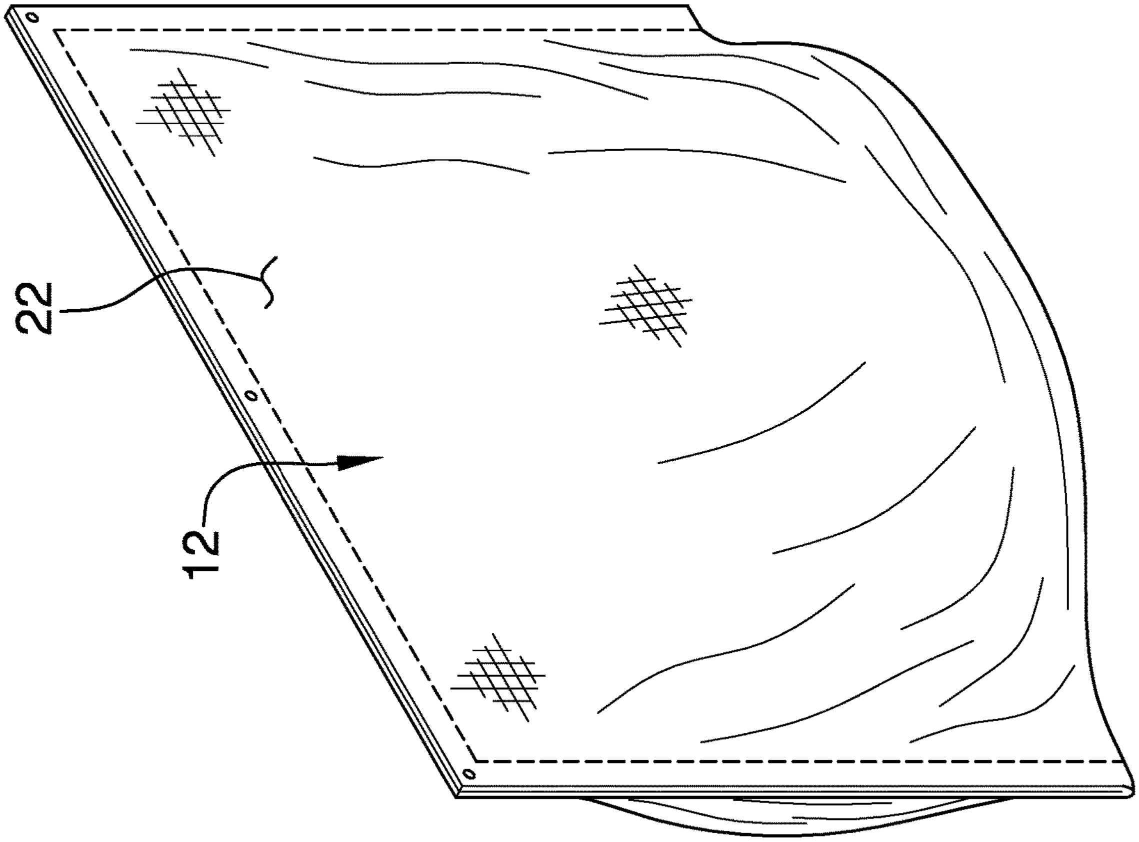
FIG. 5 is a perspective in-use view of an embodiment of the disclosure showing a tarp being folded onto itself for enclosing debris.

With reference now to the drawings, and in particular to FIGS. 1 through 5 thereof, a new waste collection device embodying the principles and concepts of an embodiment of the disclosure and generally designated by the reference numeral 10 will be described.

As best illustrated in FIGS. 1 through 5, the yard waste collection assembly 10 generally comprises a tarp 12 that is comprised of a biodegradable material, such as a paper product or other organic fiber, such that the tarp 12 will decay after a predetermined duration of time. The tarp 12 has a plurality of stake holes 14 each extending through the tarp 12. Furthermore, the tarp 12 is positionable on a horizontal support surface 16 such that debris 18 can be positioned on the tarp 12. The debris 18 might be leaves, grass clippings, branches or other types of yard waste. The tarp 12 is foldable onto itself to enclose the debris 18 that is positioned on the tarp 12.

The tarp 12 has a first surface 20, a second surface 22 and a perimeter edge 24 extending between the first surface 20 and the second surface 22, and the perimeter edge 24 has a first lateral side 26, a second lateral side 28, a top side 30 and a bottom side 32. The tarp 12 is elongated between the first lateral side 26 and the second lateral side 28. Each of the stake holes 14 extends through the first surface 20 and the second surface 22 of the tarp 12, and each of the stake holes 14 is positioned adjacent to the perimeter edge 24. The plurality of stake holes 14 includes a set of first stake holes 34 that is distributed along the first lateral side 26 of the perimeter edge 24. Furthermore, the plurality of stake holes 14 includes a set of second stake holes 36 that is distributed along the second lateral side 28 of the perimeter edge 24. The tarp 12 is foldable along a line extending between the top side 30 and the bottom side 32 of the perimeter edge 24 having the first lateral side 26 being aligned with the second lateral side 28 when the tarp 12 is folded. Additionally, the tarp 12 may have a length ranging between approximate 10.0 feet and 14.0 feet, and width ranging between approximately 6.0 feet and 10.0 feet.

A plurality of adhesive strips 38 is provided and each of the adhesive strips 38 is coupled to the tarp 12. Each of the adhesive strips 38 adheres to a respective one of the adhesive strips 38 when the tarp 12 is folded. In this way the adhesive strips 38 can retain the debris 18 in the tarp 12 thereby facilitating the tarp 12 to transport the debris 18 for disposal. Each of the adhesive strips 38 is positioned on the first surface 20 of the tarp 12 and the plurality of adhesive strips 38 extends along the perimeter edge 24. Additionally, each of the first set of stake holes 34 extends through the adhesive strip is positioned along the first lateral side 26 of the perimeter edge 24. Furthermore, each of the second set of stake holes 36 extends through the adhesive strip that is positioned along the second lateral side 28 of the perimeter edge 24.

Each of the adhesive strips 38 has an exposed surface 40 with respect to the first surface 20 of the tarp 12. The exposed surface 40 of the adhesive strip 38 that is extends along the top side 30 is folded onto itself when the tarp 12 is folded. Additionally, the exposed surface 40 of the adhesive strip 38 that extends along the bottom side 32 is folded onto itself when the tarp 12 is folded. The exposed surface 40 of the adhesive strip 38 that extends along the first lateral side 26 adhesively engages the exposed surface 40 of the adhesive strip 38 that extends along the second lateral side 28 when the tarp 12 is folded. In this way the tarp 12 is sealed to contain the debris 18 for transportation to a disposal site. A plurality of protective sheets 42 is each removably bonded to the exposed surface 40 of a respective one of the adhesive strips 38 to protect the exposed surface 40.

A plurality of stakes 44 provided and each of the stakes 44 is extendable through a respective one of the stake holes 14 to engage the horizontal support surface 16. In this way the tarp 12 is inhibited from moving on the horizontal support surface 16. Each of the stakes 44 includes a head 46 and a stem 48 extending downwardly from the head 46. The stem 48 has a distal end 50 with respect to the head 46 and the distal end 50 tapers to a point for penetrating the horizontal support surface 16.

In use, the tarp 12 is laid out onto the horizontal support surface 16, such as the ground in a yard or the like, such that the first surface 20 of the tarp 12 faces upwardly. The debris 18 is placed upon the tarp 12 until a sufficient amount of the debris 18 is collected on the tarp 12. Each of the protective sheets 42 is removed from the respective adhesive strips 38 and the tarp 12 is folded in half. Additionally, each of the adhesive strips 38 is adhered to respective adhesive strips 38 to seal the tarp 12 closed. In this way the tarp 12 can be transported to a disposal site without spilling the debris 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A yard waste collection assembly for collecting and storing yard waste for subsequent disposal, said assembly comprising:

a tarp being comprised of a biodegradable material. wherein said tarp is configured to decay after a predetermined duration of time, said tarp having a plurality of stake holes each extending through said tarp, said tarp being positionable on a horizontal support surface wherein said tarp is configured to have debris positioned on said tarp, said tarp being foldable onto itself wherein said tarp is configured to enclose the debris positioned on said tarp, wherein said tarp has a first surface, a second surface and a perimeter edge extending between said first surface and said second surface;

a plurality of adhesive strips, each of said adhesive strips being coupled to said tarp, each of said adhesive strips adhering to a respective one of said adhesive strips when said tarp is folded wherein said adhesive strips are configured to retain the debris in said tarp thereby facilitating said tarp to transport the debris for disposal;

a plurality of stakes, each of said stakes being extendable through a respective one of said stake holes and engaging the horizontal support surface to inhibit said tarp from moving on the horizontal support surface; and wherein each of said adhesive strips is positioned on said first surface of said tarp, said plurality of adhesive strips extending along said perimeter edge, wherein each of said stake holes extends through an associated one of said adhesive strips.

2. The assembly according to claim 1, further comprising said perimeter edge having a first lateral side, a second lateral side, a top side and a bottom side, said tarp being elongated between said first lateral side and said second lateral side, each of said stake holes extending through said first surface and said second surface of said tarp, each of said stake holes being positioned adjacent to said perimeter edge, said plurality of stake holes including a set of first stake holes being distributed along said first lateral side of said perimeter edge, said plurality of stake holes including a set, of second stake holes being distributed along said second lateral side of said perimeter edge, said tarp being foldable along a line extending between said top side and said bottom side of said perimeter edge having said first lateral side being aligned with said second lateral side when said tarp is folded.

3. The assembly according to claim 2, wherein each of said first set of stake holes extends through said adhesive strip being positioned along said first lateral side of said perimeter edge, each of said second set of stake holes extending through said adhesive strip being positioned along said second lateral side of said perimeter edge.

4. The assembly according to claim 2, wherein each of said adhesive strips has an exposed surface with respect to said first surface of said tarp, said exposed surface of said adhesive strip along said top side being folded onto itself when said tarp is folded, said exposed surface of said adhesive strip along said bottom side being folded onto itself when said tarp is folded, said exposed surface of said adhesive strip along said first lateral side adhesively engaging said exposed surface of said adhesive strip along said second lateral side when said tarp is folded.

5. A yard waste collection assembly for collecting and storing yard waste for subsequent disposal, said assembly comprising:

a tarp being comprised of a biodegradable material wherein said tarp is configured to decay after a predetermined duration of time, said tarp having a plurality of stake holes each extending through said tarp, said tarp being positionable on a horizontal support surface wherein said tarp is configured to have debris positioned on said tarp, said tarp being foldable onto itself wherein said tarp is configured to enclose the debris positioned on said tarp, said tarp having a first surface, a second surface and a perimeter edge extending between said first surface and said second surface, said perimeter edge having a first lateral side, a second lateral side, a top side and a bottom side, said tarp being elongated between said first lateral side and said second lateral side, each of said stake holes extending through said first surface and said second surface of said tarp, each of said stake holes being positioned adjacent to said perimeter edge, said plurality of stake holes including a set of first stake holes being distributed along said first lateral side of said perimeter edge, said plurality of stake holes including a set of second stake holes being distributed along said second lateral side of said perimeter edge, said tarp being foldable along a line extending between said top side and said bottom side of said perimeter edge having said first lateral side being aligned with said second lateral side when said tarp is folded;

a plurality of adhesive strips, each of said adhesive strips being coupled to said tarp, each of said adhesive strips adhering to a respective one of said adhesive strips when said tarp is folded wherein said adhesive strips are configured to retain the debris in said tarp thereby facilitating said tarp to transport the debris for disposal, each of said adhesive strips being positioned on said first surface of said tarp, said plurality of adhesive strips extending along said perimeter edge wherein each of said stake holes extends through an associated one of said adhesive strips, each of said first set of stake holes extending through said adhesive strip being positioned along said first lateral side of said perimeter edge, each of said second set of stake holes extending through said adhesive strip being positioned along said second lateral side of said perimeter edge, each of said adhesive strips having an exposed surface with respect to said first surface of said tarp, said exposed surface of said adhesive strip along said top side being folded onto itself when said tarp is folded, said exposed surface of said adhesive strip along said bottom side being folded onto itself when said tarp is folded, said exposed surface of said adhesive strip along said first lateral side adhesively engaging said exposed surface of said adhesive strip along said second lateral side when said tarp is folded;

a plurality of protective sheets, each of said protective sheets being removably bonded to said exposed surface of a respective one of said adhesive strips to protect said exposed surface; and a plurality of stakes, each of said stakes being extendable through a respective one of said stake holes and engaging the horizontal support surface to inhibit said tarp from moving on the horizontal support surface, each of said stakes including a head and a stem extending downwardly from said head, said stem having a distal end with respect to said head, said distal end tapering to a point for penetrating the horizontal support surface.

* * * * *